July 4, 1967  V. ECKHARDT  3,328,868
METHOD FOR MANUFACTURE OF SINGLE
OR MULTICOMPARTMENT PIPES
Filed Nov. 4, 1963

INVENTOR
VILEM ECKHARDT
BY Dicke + Craig
ATTORNEYS

United States Patent Office 3,328,868
Patented July 4, 1967

3,328,868
METHOD FOR MANUFACTURE OF SINGLE OR MULTICOMPARTMENT PIPES
Vilem Eckhardt, Paris, France, assignor to Driam S.A., Vaduz, Liechtenstein
Filed Nov. 4, 1963, Ser. No. 321,083
Claims priority, application Germany, Nov. 8, 1962, D 40,230
3 Claims. (Cl. 29—157)

The present invention relates to a method for the manufacture of single or double-compartment pipes by cold-working or cold-deformation of sectional or structural members.

It is already known in the prior art to manufacture single-chamber or double-chamber pipes, that is, single-compartment and double-compartment tubular members by bending metallic section bars transversely to the longitudinal direction thereof to such an extent until the longitudinal edges of these sectional bars approach one another. This takes place by drawing of the sectional members through a funnel. The pipes made in this manner, however, were not suitable as compression members or hollow bodies in the field of structural engineering.

The aim of the present invention is to manufacture such types of single-compartment or multicompartment pipes from sectional or structural members in such a manner that they are also suitable for use as structural parts and thereby satisfy the torsional and buckling stresses and loads to be expected therewith. As solution of the underlying problem, the present invention proposes a method of manufacture which is characterized by the fact that a U-shaped sectional or structural member or two nested U-shaped sectional members, one placed within the other, or a double U-shaped or H-shaped sectional member or an H-shaped sectional member with U-shaped sectional members inserted between the flanges thereof are turned or twisted about the longitudinal center line passing through the web of the sectional member or of the main sectional member accommodating therein the other sectional members, respectively, to such an extent until the free longitudinal edges of the leg portions or flanges contact one another which are thereupon welded together.

Accordingly, it is an object of the present invention to provide a method for the manufacture of single or multicompartment pipes which obviates the shortcomings and drawbacks encountered with the prior art methods by simple means.

Another object of the present invention resides in the provision of a method for the manufacture of single or multicompartmented pipes which not only permit the use of standard machinery and equipment, but also results in structural elements that may be used as struts, compression members, and/or hollow bodies in the field of structural engineering.

Another object of the present invention resides in the provision of a method for manufacturing single- or double-compartmented pipes which are capable of withstanding torsional stresses and buckling loads that may be expected during use as structural parts.

Still a further object of the present invention resides in the provision of a method for manufacturing single or multicompartmented pipes and to the pipes realized thereby which can be made with standard machinery and without requiring special skill.

These and other objects, features and advantages of the present invention will become more obvious from the following description when taken in connection with the accompanying drawing which shows, for purposes of illustration only, several embodiments in accordance with the present invention, and wherein.

Figure 5:
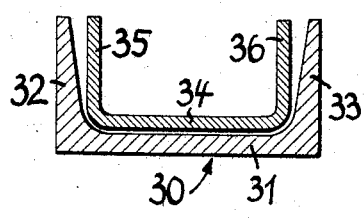
Figure 6:
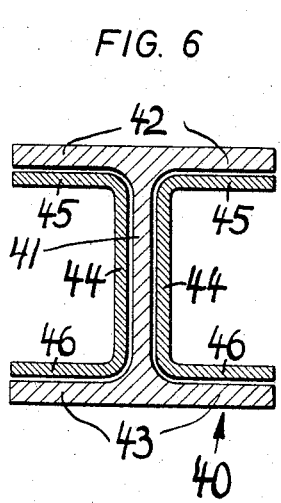

FIGURE 5 is a transverse cross sectional view through two U-shaped nested sectional members, one placed within the other, before twisting thereof into a compartmented pipe in accordance with the present invention, and FIGURE 6 is a cross sectional view through a double U-shaped or H-shaped sectional member with U-shaped sectional insert members inserted between the flanges thereof before twisting into a compartmented pipe in accordance with the present invention.

Figure 1:
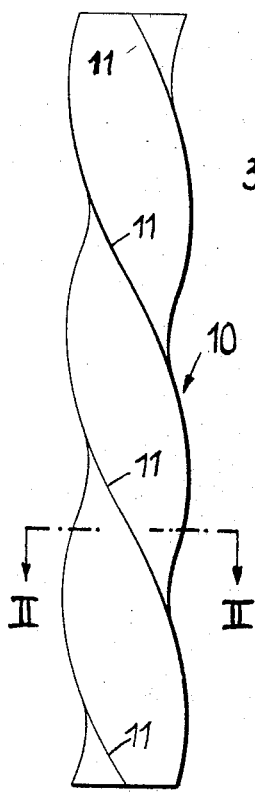
FIGURE 1 is a partial elevational view of a U-shaped sectional member twisted into a sectional structural member in accordance with the present invention.
Figure 2:
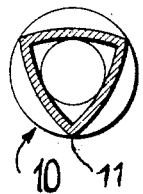
FIGURE 2 is a cross sectional view through the structural member of FIGURE 1, taken along line II—II of FIGURE 1.

Referring now to the drawing wherein like reference numerals are used throughout the various views to designate like parts, and more particularly to FIGURES 1 and 2, reference numeral 10 generally designates therein a compartmented pipe obtained by twisting a U-shaped sectional structure of which each of the leg portions is of substantially the same length as the web portion, as indicated in FIGURE 2, thereby forming a pipe with a single compartment. The welding seam is indicated by reference numeral 11.

Figure 3:
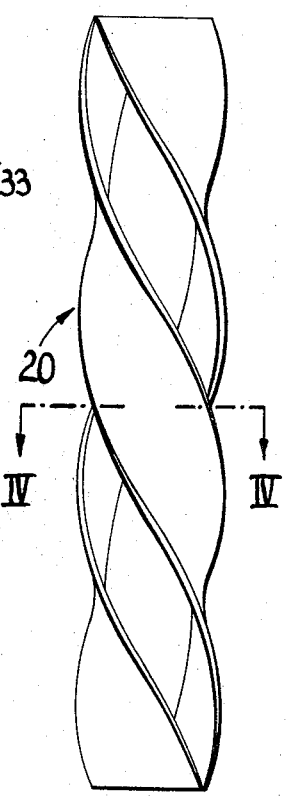
FIGURE 3 is a partial elevational view, similar to FIGURE 1, of a modified embodiment of an H-shaped sectional member twisted into an H-shaped structural member in accordance with the present invention.
Figure 4:
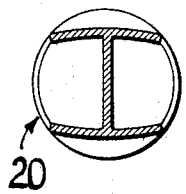
FIGURE 4 is a cross sectional view through the structural member of FIGURE 3, taken along line IV—IV of FIGURE 3.

In FIGURES 3 and 4, the multicompartmented pipe, obtained by twisting an H-shaped sectional structure, is generally designated by reference numeral 20. The H-shaped sectional structure 20 may be of the type shown in FIGURE 6, however, without the presence of the U-shaped auxiliary inserts.

In FIGURE 5, reference numeral 30 generally designates two substantially U-shaped nested sectional members as they appear before twisting thereof. More particularly, in FIGURE 5, the outer U-shaped member forming the main sectional member comprises a web portion 31 and two leg portions 32 and 33, respectively. The inner U-shaped sectional member, in turn, comprises a web portion 34 and two leg portions 35 and 36.

Reference numeral 40 generally designates in FIGURE 6 the structural assembly for realizing a multicompartmented pipe by twisting the same in accordance with the present invention. More particularly, the main sectional element includes a web portion 41 and two flange or leg portions 42 and 43. Between the flanges or leg portions 42 and 43, to both sides of the web portion 41, are inserted substantially U-shaped auxiliary sectional members of identical construction and each including a web portion 44 and two leg portions 45 and 46, respectively.

The realization of the manufatcuring method in accordance with the present invention is simple and requires no costly special equipment and/or machinery. The rotating or twisting of the sectional bars may be realized with a conventional, correspondingly dimensioned turning lathe.

Pipes or hollow bodies such as, for example, hollow compression rods can be readily manufactured with the aid of the present invention which exhibit considerably higher buckling and torsional rigidity than those of the prior art single or multicompartment pipes, and therefore can also be utilized without difficulty as structural parts.

Pursuant to the method in accordance with the present invention, the sectional bar or bars, upon proper assembly, are twisted, for example, in a turning lathe, about the center longitudinal line passing through the web portion of the sectional bar or of the main sectional member accommodating therein the other sectional members, as the case may be. The free longitudinal edges of the leg portions or flanges thereby come into mutual abutment as a result of the twisting, and are welded together in any suitable conventional manner. Examples of the structural elements are illustrated in FIGURES 1 through 4.

While I have shown and described several embodiments in accordance with the present invention, it is understood that the same is not limited thereto but is susceptible of numerous changes and modifications within the spirit and scope thereof, and I therefore do not wish to be limited to the details shown and described herein, but intend to cover all such changes and modifications as are encompassed by the scope of the appended claims.

I claim:

1. In a method for manufacturing compartmental pipes by cold deformation of sectional assemblies, each of said assemblies comprising a main sectional member having a web portion and leg portions, each of said assemblies further comprising an auxiliary sectional member having a web portion complementary to said first-named web portion and leg portions complementary to said first-named leg portions, said method comprising:

assembling of said auxiliary sectional member in mutually adjacent relationship with said main sectional member, said web portion and said leg portions of said auxiliary sectional member being respectively juxtaposed to said web portion and said leg portions of said main sectional member, the free terminal edge portions of said first-named and second-named leg portions being disposed in mutually juxtaposed relationship, twisting, by cold deformation, said sectional assembly about the central longitudinal line passing through said web portion of said main sectional member, continuing the twisting the movement of said terminal edge portions of said first-named leg portions to cause the same to come into mutually abutting relationship with said terminal edge portions of said second-named leg portions, while maintaining said mutually juxtaposed relationship, and welding together all of said mutually abutting terminal edge portions.

2. A method according to claim 1, wherein said main sectional member is U-shaped.

3. A method according to claim 1, wherein said main sectional member is H-shaped.

References Cited

UNITED STATES PATENTS

| 673,305 | 4/1901 | Timms | 29—477 |
| 1,802,397 | 4/1931 | Trachsel. | |

FOREIGN PATENTS

| 491,056 | 8/1938 | Great Britain. |
| 644,166 | 5/1928 | France. |

JOHN F. CAMPBELL, *Primary Examiner.*

J. D. HOBART, P. M. COHEN, *Assistant Examiners.*